United States Patent [19]

Frost

[11] 3,984,375

[45] Oct. 5, 1976

[54] AROMATIC AMIDE-IMIDE POLYMERS
[75] Inventor: Lawrence W. Frost, Murrysville, Pa.
[73] Assignee: Westinghouse Electric Corporation, Pittsburgh, Pa.
[22] Filed: Dec. 12, 1963
[21] Appl. No.: 330,054

[52] U.S. Cl.................. 260/47 CP; 260/29.2 N; 260/30.2; 260/30.8 DS; 260/32.6 NA; 260/63 R; 260/63 HA; 260/78 TF; 427/407; 428/474
[51] Int. Cl.²......................................... C08G 73/14
[58] Field of Search................ 260/78 TF, 47 C, 65

[56] References Cited
UNITED STATES PATENTS

| | | | |
|---|---|---|---|
| 3,179,614 | 4/1965 | Edwards............................ | 260/78 TF |
| 3,179,632 | 4/1965 | Hendrix............................ | 260/78 TF |
| 3,179,633 | 4/1965 | Endrey.............................. | 260/78 TF |
| 3,179,634 | 4/1965 | Edwards............................ | 260/78 TF |
| 3,179,635 | 4/1965 | Frost et al........................ | 260/78 TF |
| 3,260,691 | 7/1966 | Lavin et al....................... | 260/78 TF |

FOREIGN PATENTS OR APPLICATIONS

| 570,858 | 7/1945 | United Kingdom............. | 260/78 TF |

Primary Examiner—Harold D. Anderson
Attorney, Agent, or Firm—A. Mich, Jr.

EXEMPLARY CLAIM

1. A polyamide-imide resin consisting essentially of the repeating amide-imide polymeric unit wherein R is a member selected from the group consisting of and copolymers thereof, in which X is an integer of from 1 to about 500.

17 Claims, 2 Drawing Figures

U.S. Patent  Oct. 5, 1976  3,984,375
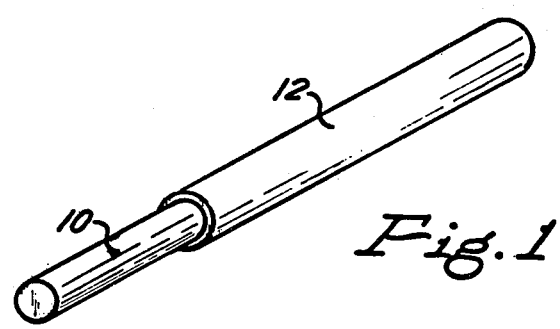
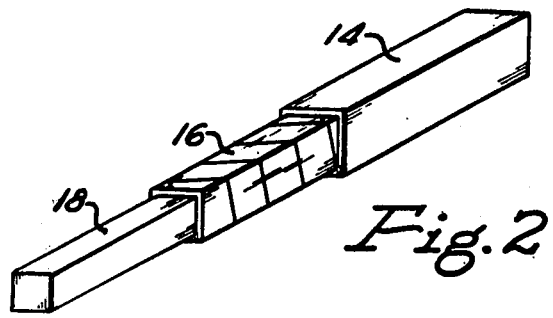

AROMATIC AMIDE-IMIDE POLYMERS

This invention relates to resinous polymers and in particular concerns aromatic amide-imide polymers obtained by the reaction of certain anhydrides and aromatic diamines.

The novel polymers of the present invention constitute a new class of thermally stable polymers, that have oxidative stability and tank life, good film forming properties, toughness, good flexibility and other properties which make them particularly suitable for use as wire enamels, molding and laminating resins, films for electrical insulating or mechanical use, varnish components, and the like. Moreover, these new materials exhibit properties not possessed by materials now used for similar applications.

For understanding of the invention, reference is made to the following detailed description taken in conjunction with the accompanying drawing in which:

FIG. 1 is a perspective view of an electrical conductor provided with insulation in accordance with the invention; and FIG. 2 also is a perspective view showing a modification of the invention.

In general, the resins of the present invention comprise aromatic amide-imide polymers containing the repeating unit

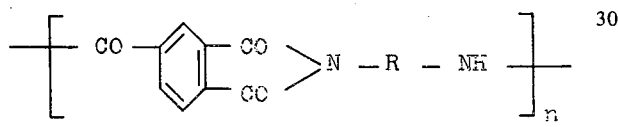

where $n$ is an integer of about 50 to 15,000 and R is a divalent organic radical composed only of H,C,N,S and O, for example any divalent radical selected from the group consisting of

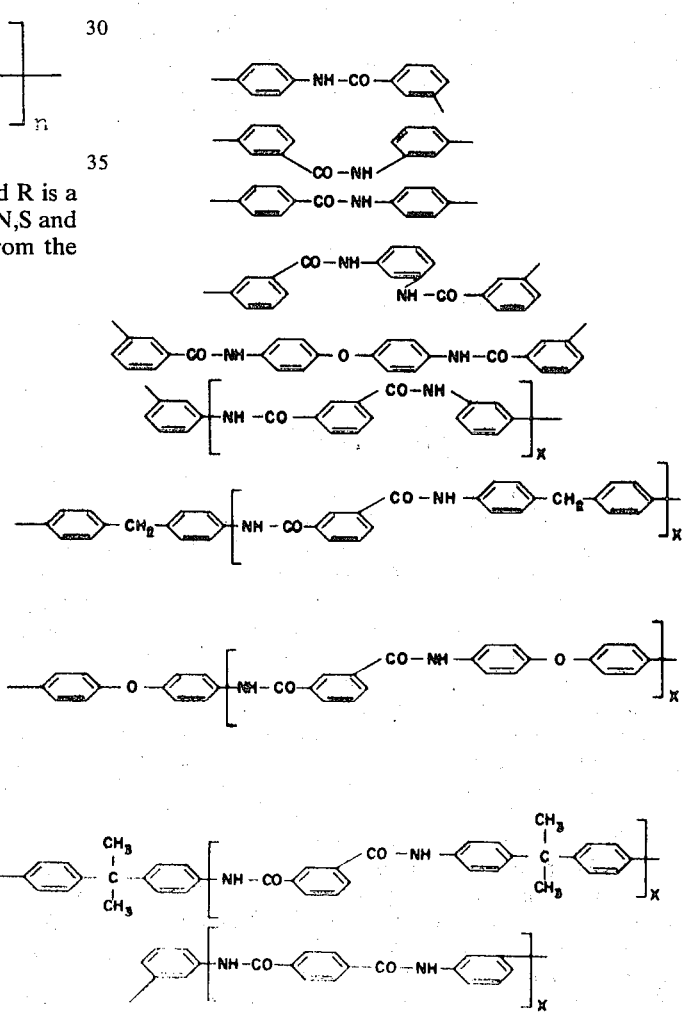

in which X is an integer of from 1 to about 500. Copolymers containing two or more of the radicals just given may be particularly valuable in some instances.

It should be apparent that R may also be described as a divalent carbocyclic aromatic radical. R may also be described as a divalent radical containing two carbocyclic aromatic rings bridged by a divalent group selected from the group consisting of — NH — CO —,

— O —, — S —, — CH$_2$ — and

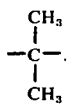

R in some instances may be described as derived from an amine terminated polyamide.

In general many of the finished or cured solid polymers within the scope of the present invention are both infusible below about 250°C. and insoluble in most solvents. However, by the method of preparation polymeric intermediates of the final polymer are formed and these are soluble in certain useful solvents. The intermediates conform to the following:

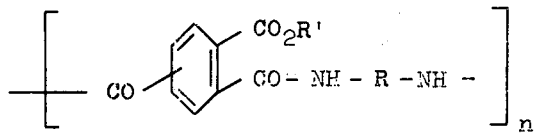

where R and $n$ are as already defined and R' is selected from the group consisting of hydrogen and monovalent hydrocarbon radicals of about 1 to 15 carbon atoms, for example monovalent aliphatic or alkyl radicals. Upon heating the intermediate water or an alcohol, depending on the identity of R', is driven off resulting in the amide-imide already described.

The polymeric intermediates of our invention are soluble in a variety of solvents such as N,N-dimethyl acetamide (DMAC), dimethyl sulfoxide, N,N-dimethyl formamide, N-methyl-2-pyrrolidone, in some cases aqueous bases such as sodium or ammonium hydroxide or sodium bicarbonate, and the like. Such intermediate solutions are useful in casting laminates or films of the polymers or applying them as enamels to substrates such as wire, fillers, cloth, and the like.

In general the polymers of the invention are prepared by a process comprising reacting trimellitic anhydride halide or a monoester of trimellitoyl dihalide and a diamine including, for example, amine terminated polyamides. The chlorides are the preferred halides in each of the foregoing instances, and the hydrocarbon moiety in the monoester portion of the monoester trimellitoyl dihalide preferably is lower alkyl. The reaction is normally conducted in a polar solvent, such as N,N-dimethyl-formamide; N,N-dimethylacetamide; N-methyl-2-pyrrolidone; dimethyl sulfoxide or the like. Alternatively, each reactant can be dissolved in a solvent and the resulting solutions mixed to cause reaction. For example water and xylene can be employed as solvents in this manner. A base may be employed to absorb hydrogen chloride produced in the reaction, typical bases being alkali metal carbonates such as sodium carbonate, monoamines such as triethylamine, and basic ion exchange resins.

The reaction is essentially a condensation polymerization and accordingly about equal molar quantities of the reactants generally are used, though an excess, preferably below about 10 to 15 molar percent, of either reactant can also be used. The reactions occur at room temperature, but heating up to about 150°C. can be practiced if desired.

The resulting intermediate polymer, which is a polyamide acid or polyamide ester depending on the reactants employed, is generally soluble in the solvent used. A useful varnish or wire enamel is obtained by filtering off insoluble by-products, if any are present. When the resin solutions are applied and baked, as in wire enameling or varnishing applications, solvent is driven off and the curing reaction occurs forming cyclic imide groups upon removal of water or alcohol from the polymer. In some instances, for example in some laminating applications, it is desirable to remove a large part of the solvent at a relatively low temperature to give an uncured or partly cured solid resin, which will flow and bond during further processing, at which time the curing reaction is further advanced. Curing of the intermediate to form the final polymer generally is effected at 25° to 175°C. or higher for one-half to 20 hours or more.

Outstanding advantages of the invention include the unexpected result that certain of the resins can be applied as enamels to wire at much higher speeds than is possible with enamels used heretofore for similar applications. Since a substantial fraction of the total cost of the enameled wire is determined by the tower time required, an increase in coating speed can mean a significant cost reduction. The alkali resistance of the resins of this invention is considerably better than that of the other wire enamels of analogous nature. The systems based on the reactants having an ester group have the further advantage in that no water is produced during curing. Instead, alcohol is eliminated and alcohols do not have the degrading effect upon the polymer that water has. Consequently relatively thick sections can be cured without hydrolytic degradation, an advantage of particular importance in laminating and varnish dipping operations. This is further advantageous in that where a hygroscopic solvent is used, there is less loss of reactant due to hydrolysis than otherwise would be encountered. Moreover, degradation and viscosity loss during storage in solution are largely eliminated.

As noted one of the primary reactants is a diamine. By this is meant an organic compound having two reactive amine groups, though there may be other groups present. For example, in the list of divalent radicals given hereinbefore, which are the radical portions of the diamines used, various other groups are present. Some of these other groups may introduce other imide groups, as would occur when an additional dianhydride such as pyromellitic dianhydride or the like is used. In addition further amide groups can be introduced by the use of a di-basic acid or a reactive derivative thereof, such as the halide, e.g. the chloride. These modifications permit the preparation of a variety of copolymers having a wide range of amide-imide ratios and physical properties. Typical diamines that can be used include, for example, one or more aromatic diamines such as m-phenylene diamine, p,p'-diamino diphenyl methane, p,p'-diamino diphenyl ether, p,p'-diamino diphenyl sulfide, and p-phenylene diamine.

To prepare more complex diamine reactants, the foregoing diamines can be reacted with one or more aromatic diacyl halides, such as isophthaloyl or terephthaloyl chloride, suitably with an excess of the diamine. As the ratio of those reactants approaches one, the number of amide linkages per molecule increases. In this way the ratio of amide to imide groups in the diamine reactant and in the final polymer can be conveniently controlled.

Further, an aromatic nitro acyl halide, such as nitro benzoyl chloride can be reacted with an aromatic nitro amine such as nitro-aniline, followed by reduction of the resulting dinitro amide to a diamino amide. This method results in diamines containing one amide group. Other common methods are available for producing suitable diamines, and combinations of the methods can be used advantageously in some cases to produce complex or polymeric diamines that can be used.

Trimellitic anhydride halide for use is readily prepared from trimellitic anhydride by treatment with a suitable halogenating agent such, for example, as thionyl chloride, phosgene, phosphorus pentachloride and the like. Excess of the chlorinating agent is generally employed. The reaction normally is carried out in a solvent such as benzene, benzyl chloride, petroleum ether or the like, at a temperature of about 10° to 200°C. for about 2 to 24 hours. Stirring and reflux conditions aid in the reaction.

The monoester of trimellitic dichloride is conveniently prepared by the reaction of thionyl chloride or phosgene with a 1- or 2-monoester of trimellitic acid or a mixture of the two acids. Generally the mixture is easier to prepare, is satisfactory for use in the invention and results in the same polymer as would the use of either monoester alone. Reaction can be effected in a polar solvent at a temperature below about 100°C., while stirring and using reflux conditions if desired. The monoester can be prepared, for example, by reaction of an alcohol such as methanol or ethanol with trimellitic anhydride for about 1 to 10 or more hours at temperatures up to about 100°C. or the boiling point of the alcohol employed. Excess alcohol can be used as a convenient reaction medium.

The invention will be described further in conjunction with the following specific examples in which the details are given by way of illustration and not by way of limitation.

Trimellitic anhydride chloride was prepared by the following process.

EXAMPLE I

A mixture of 384 g. of trimellitic anhydride and 357 g. of thionyl chloride was refluxed with stirring for 12 hours to give a clear yellow liquid. Excess thionyl chloride was removed by distillation, and the residue was distilled under vacuum of 0.1 to 0.5 mm. Hg at 125°–133°C. to give 339 g. (81% yield) of light yellow crystalline solid. Recrystallization from a mixture of benzene and petroleum ether gave a white product having a melting point (m.p.) of 69.5°–70.0°C.

The analysis ($C_9H_3O_4Cl$) was calculated: C, 51.3; H, 1.44; Cl, 16.83. Found: C, 51.6; H, 1.62; Cl, 17.18.

Monomethyl trimellitoyl dichloride was prepared as shown in Examples II and III.

EXAMPLE II

A mixture of 192 g. of trimellitic anhydride and 250 ml. of dry methanol was refluxed for 3 hours while stirring. Most of the solid dissolved in the first few minutes, and then a granular white precipitate slowly formed. Most of the excess methanol was distilled off, and the residual thick slurry was spread in a thin layer and dried by passing nitrogen over it at room temperature for 24 hours. The product was a white powder weighing 226 g. (calc. 224), mp. 180°–208°C. The neutral equivalent was found to be 116 (calc. 112). This product is a mixture of 1-methyl trimellitate (mp 177°, 203.5°–205.5°) and 2-methyl trimellitate (mp 208°).

EXAMPLE III

A mixture of 119 g. of purified thionyl chloride and 56 g. of the product of Example II was refluxed for 1 hour while stirring to give a clear, light yellow solution. Dry air was drawn in a slow stream through the product at room temperature and a pressure of about 15 mm. Hg for 2 hours. The resulting monomethyl trimellitoyl dichloride was obtained as a yellow liquid weighing 61 g. (94% yield). The neutral equivalent was 68 (calc. 65).

EXAMPLE IV

An amide-imide copolymer was prepared as follows:

A mixture of 703 g. of m-phenylenediamine, 3624 g. of N,N-dimethylacetamide (DMAC) and 2550 g. of sodium carbonate was stirred while a solution of 915 g. of isophthaloyl chloride, 305 g. of terephthaloyl chloride and 1465 g. of xylene was added slowly. The temperature of the reaction mixture was kept at about 20°C. during the addition by cooling in an ice bath. The mixture was stirred for 1 hour after completion of the addition, and was then filtered. The clear filtrate was concentrated by distillation at 50°C. and 2–3 mm pressure, and was filtered again to give 4286 g. of brown solution containing 26.2% solids. This resin intermediate was an amine-terminated polyamide containing 4.54 moles of m-phenylenediamine and 3 moles of isophthalate per mole of terephthalate.

A mixture of 30 g. of the resin intermediate solution and 0.5 g. of triethylamine was stirred while 0.906 g. of the trimellitic anhydride chloride product of Example I was added slowly. A cloudy, viscous solution was obtained, which was filtered and passed twice through a column of basic ion exchange resin (Amberlite IRA-400). The column was rinsed with additional DMAC. The combined filtrate and rinsings weighed 47.5 g. and contained 17.8% solids (99% yield). A 2 mil film was cast by baking a coating of the solution on aluminum for 2 hours at 150°C. The film was stripped from the substrate and was found to be clear and flexible. It could be creased in alternate directions along the same line about five times before cracking.

EXAMPLE V

An amide-imide-ether polymer was prepared as follows: A mixture of 1.000 g. of 4,4'-diaminodiphenyl ether, 10.6 g. of DMAC, and 1.06 g. of sodium carbonate was stirred while 1.089 g. of the trimellitic anhydride chloride prepared in Example I was added slowly. The mixture was filtered to give a viscous, light yellow solution, from which a continuous, clear yellow film was cast.

As noted hereinbefore, the polymers can also be prepared using monomethyl trimellitoyl dichloride.

EXAMPLE VI

A solution of 2.7 g. of m-phenylenediamine, 20 g. of borax and 500 g. of water was stirred in a high-speed blender while a solution of 6.5 g. of the monomethyl trimellitoyl dichloride product of Example III in 100 g. of xylene was added rapidly. The mixture was stirred for 5 minutes, and sodium chloride was added to coagulate the product. The solid was filtered off, washed with water, and dried under vacuum at room temperature. The resulting powder was dissloved in DMAC, and a film of the solution was baked for 2 hours at 150°C. A clear, brown film of moderate flexibility was obtained.

EXAMPLE VII

A mixture of 68 g. of 3,4'-diaminobenzanilide, 249 g. of DMAC and 127 g. of sodium carbonate was stirred while a solution of 78 g. of the monomethyl trimellitoyl dichloride product of Example III and 125 g. of xylene was added slowly. The mixture was kept at 10°–20°C. by external cooling during the addition, and was then stirred for 3 hours at room temperature. Filtration gave a slightly cloudy solution, which was stirred for one hour with 100 g. of sodium carbonate and filtered again to give a solution containing 20.1% resin solids. A 200 g. sample of the solution was stirred at room temperature while 1.256 g. of pyromellitic dianhydride was added in small portions. The resulting solution was light yellow, nearly clear, 20.6% solids, and had a viscosity of 850 centistokes at 23°C. A 2.5 mil film was cast from part of the solution by baking for 1 hour at 150°C. and 1 hour at 200°C. It was stripped frm the substrate and found to be clear yellow and capable of being creased five times in alternate directions along the same line before cracking.

A 32 g. sample of the solution was placed in an aluminum dish 2¼ inch in diameter and cured with the following schedule: 2 hours at 50°C. under vacuum; 19 hours at 100°C. under vacuum; 6 hours at 150° under vacuum; and 1 hour at 200°C. in air. The product was a clear, hard, tough resin, full of bubbles.

A 30 g. sample of the solution was placed in a similar aluminum dish and baked at 125°C. for 72 hours in air. The product was a tough, stiff resin, which had pulled away from the walls of the dish. The thickest part was about 200 mils in thickness, somewhat cloudy at the bottom, but tough and intact throughout.

EXAMPLE VIII

A mixture of 1740 g. of DMAC, 227 g. of 3,4'-diaminobenzanilide and 424 g. of sodium carbonate was cooled in an ice bath and stirred while 260 g. of the product of Example III was added at such a rate that the temperature did not exceed 20°C. After 1 hour of stirring, the mixture was filtered. Additional DMAC was added to facilitate filtration, and the excess solvent was then evaporated from the filtrate at 50°C. under vacuum. The final solution weighed 1999 g. and contained 17.0% solids.

A sample of the solution was placed in an aluminum dish and cured 1 hour at room temperature, 1 hour at 150°C., and 2 hours at 200°C. to give a clear amber, flexible film, 8 mils thick.

EXAMPLE IX

A polymer solution made by the method of Example VIII was applied to strips of 4 mil, No. 116 heat-cleaned glass cloth as follows: The first coat was applied with a solution containing 12.3% solids, and having a Demmler No. 1 viscosity of 135 sec. The glass cloth was dipped in the solution and then air dried for 30 minutes. Then it was baked for 30 minutes at 125°C. A second coat was provided using an identical procedure but followed by additional baking for 45 minutes at 200°C. Then a third coat was applied with a solution having 20.3% solids and viscosity of Z-1 Gardner. The sample was dipped therein and transferred immediately to a 125°C. oven, where it was baked for 30 minutes at 125°C. and then 45 minutes at 200°C.

The coated cloth had a total thickness of 7 mils, was smooth, yellow, translucent and flexible. It had a breakdown voltage of 8.5 KV.

A sample of the treated cloth was dipped a fourth time, using the 12.3% solids-solution of the resin, and was dried for 45 minutes at 100°C. Five 2½ inch square sheets of the resultant product were stacked and pressed for 5 minutes at 250 psi and 200°C., and then for 55 minutes at 1500 psi and 200°C. A well bonded board was obtained having a thickness of 38 mils.

EXAMPLE X

A mixture of 43 grams of 4,4'-diaminodiphenyl sulfide, 223 grams of dimethylacetamide, and 85 grams of sodium carbonate was cooled to between minus 10° to minus 15°C. and held at that temperature, while stirring. A solution of 52 grams of monomethyl trimellitoyl dichloride product of Example III and 74 grams of xylene was added slowly. The mixture was allowed to warm to room temperature, was stirred for 3 hours, and was then filtered. A clear amber solution containing 22.5 per cent solids was obtained, and from which films could be cast by baking at 200°C. for several hours.

It is known that the presence of free amine, anhydride or water causes a substantial drop in viscosity of prior art polymer solutions of analogous polymers. To test the present invention, an additional one half mole of 4,4'-diaminodiphenyl sulfide was added to the product of Example X for each mole of polymer resin. Upon standing at 35°C. for 50 hours, the viscosity decrease was negligible compared to that of the prior art solutions.

The surprising characteristic of the invention in permitting faster wire coating speeds is evident in the following example.

EXAMPLE XI

The product of Example VIII was die-coated on No. 17 A.W.G. copper wire in a commercial wire enamelling tower, using six dips. The tower temperatures were 300°C. (top) and 250°C. (bottom). Satisfactory, smooth coatings at 2.8 to 3.2 mils buildup were obtained at speeds from 22 to 60 feet per minute. The maximum elongation that would permit winding the stretched sample on its own diameter without damage varied from 20 to 30%. Scrape abrasion values ranged from 2-3 at 60 feet per minute to 73-83 at 22 feet per minute. A sample of wire coated at 50 feet per minute was post-cured at 150°C. for 30 minutes to give a product having a scrape abrasion value of 132 which may be compared with values of 15 to 25 for some commercial high temperature wire enamels. This product could be wound on its own diameter after being stretched to the breaking point (about 35% elongation).

FIG. 1 illustrates a conductor 10 coated with an insoluble, baked enamel 12 of the invention as just described. Of course the polymers can be applied otherwise, for example as illustrated in FIG. 2. Thus the polymer enamel 14 is applied over glass serving 16 surrounding the conductor 18.

EXAMPLE XII

A solution of 32.4 grams of m-phenylene diamine, 76 grams of triethylamine and 400 grams of dimethyl acetamide is stirred while 30.5 grams of isophthaloyl chloride are added slowly. The reaction, which is exothermic, results in a temperature of about 64°C. The mixture then is cooled and filtered to remove the precipitate of triethylamine hydrochloride. The filtrate is diluted to a total weight of 531 grams with dimethyl acetamide. The solution is stirred while monobutyl trimellitoyl dichloride (45.5 grams) is added slowly. The mixture is stirred at room temperature for 1 hour and filtered. The resulting solution can be used to cast films of the polymer or as an enamel.

EXAMPLE XIII

A solution of 47.5 grams of 4,4'-methylene dianiline, 29 grams of triethylamine and 450 grams of dimethyl acetamide is stirred while a mixture of 18.3 grams of isophthaloyl chloride and 6.1 grams of terephthaloyl chloride is added thereto. The mixture is filtered, using diatomaceous earth as a filter aid. On standing overnight, the filtrate deposits a considerable amount of crystalline solid. The filtrate, including the crystalline solid, is stirred vigorously while 24.3 grams of trimellitic anhydride chloride is added. The solution is filtered again, and more of the anhydride chloride (0.6 gram) is added to the filtrate with continued stirring. The total amount of the anhydride chloride added is 24.9 grams. Clear films can be cast therefrom.

EXAMPLE XIV

One mol of m-phenylene diamine is dissolved in water with two mols of sodium hydroxide. While stirring vigorously, there are added to the solution two mols of m-nitrobenzoyl chloride. The resulting N,N'-bis (m-nitrobenzoyl)-m-phenylene diamine is washed with dilute aqueous sodium hydroxide, dilute aqueous hydrochloric acid, and water and then dried at 150°C. The product is obtained in 90% yield.

The N,N'-bis (m-nitrobenzoyl)-m-phenylene diamine is hydrogenated to N,N'-bis (m-aminobenzoyl)-m-phenylene diamine with a Raney nickel catalyst to give a 69% yield. The hydrogenation solvent is composed of three parts of gamma-butyrolactone and 20 parts ethanol.

Then 34.6 grams of N,N'-bis (m-aminobenzoyl)-m-phenylene diamine are dissolved in 170 grams of dimethyl acetamide. A total of 19.5 grams of monoethyl trimellitoyl dichloride is added initially over a 10 minute period. Additional increments of the dichloride are added at 15 minute intervals until a total of 27.5 g. have been added. Sodium carbonate (43 g.) is added and the mixture stirred at room temperature for 2 hours. Filtration gives a solution that can be used as an enamel.

I claim as my invention:

1. A polyamide-imide resin consisting essentially of the repeating amide-imide polymeric unit

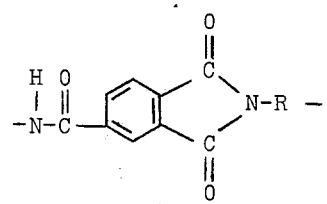

wherein R is a member selected from the group consisting of

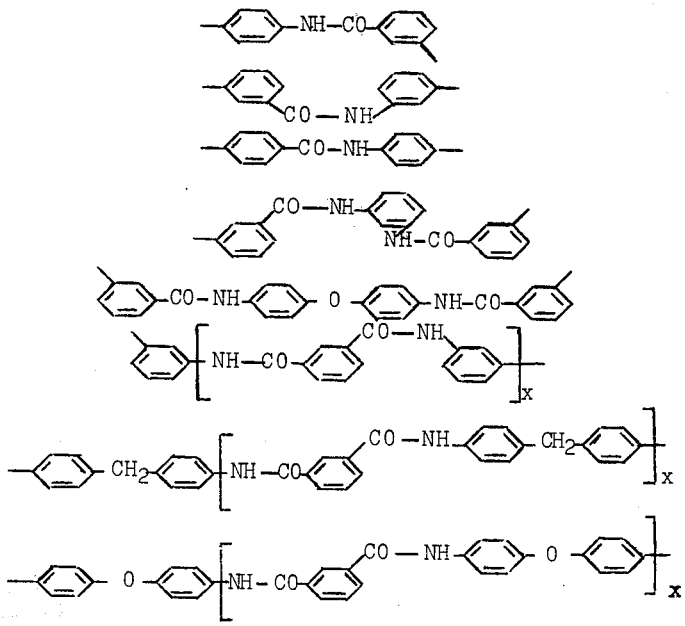

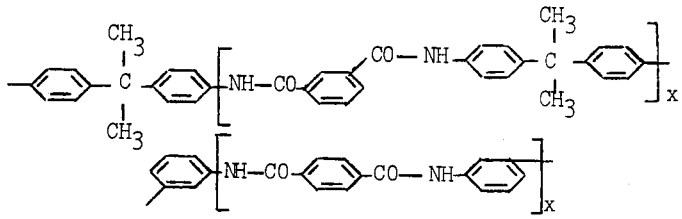

and copolymers thereof, in which X is an integer of from 1 to about 500.

2. An electrical conductor coated with the polymer of claim 1.

3. A polymer consisting essentially of the repeating unit

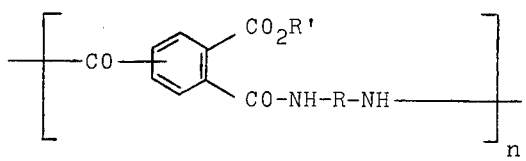

in which the free acyl group is on one of the 4 or 5 positions, R' is a monovalent hydrocarbon radical containing 1 to 15 carbon atoms and R is a divalent radical selected from the group consisting of

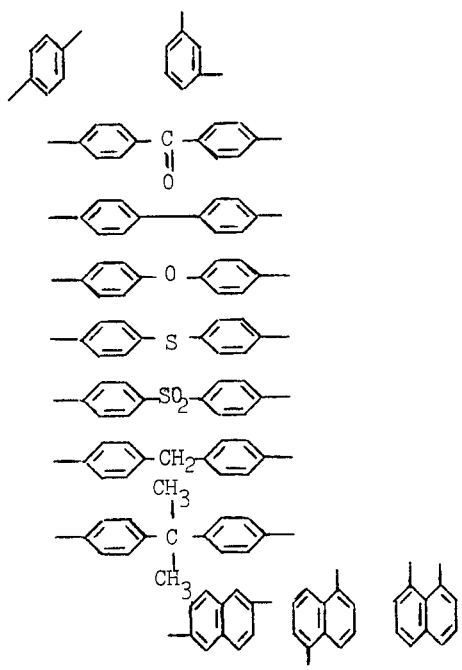

and $n$ is an integer of about 50 to 15,000.

4. A film forming polymer consisting essentially of the repeating unit

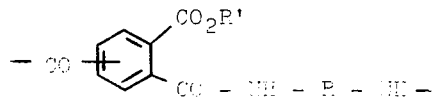

in which the free acyl group is on one of the 4 and 5 positions, R' is a monovalent hydrocarbon radical containing 1 to 15 carbon atoms and R is a divalent carbocyclic aromatic radical.

5. The polymer of claim 4 in which R is a monovalent aliphatic radical.

6. The polymer of claim 4 in which R is a divalent radical containing two carbocyclic aromatic rings bridged by a divalent group selected from the group consisting of $-$ NH $-$ CO $-$,

$-$ O $-$, $-$ S $-$, $-$ CH$_2$ $-$ and $$-\underset{CH_3}{\overset{CH_3}{\underset{|}{\overset{|}{C}}}}-.$$

7. A solution of the polymer of claim 4.
8. A solution of the polymer of claim 5.
9. A flowable and bondable solid of the polymer of claim 4.
10. A flowable and bondable solid of the polymer of claim 5.
11. A film forming polymer consisting essentially of the repeating unit

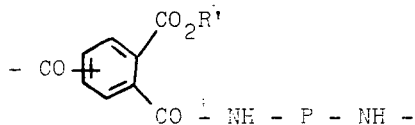

in which the free acyl group is on one of the 4 and 5 positions, R' is $-$ H or a monovalent hydrocarbon radical containing 1 to 15 carbon atoms and R is a divalent radical containing two carbocyclic aromatic rings bridged by the group

12. The polymer of claim 11 where R is selected from the group consisting of

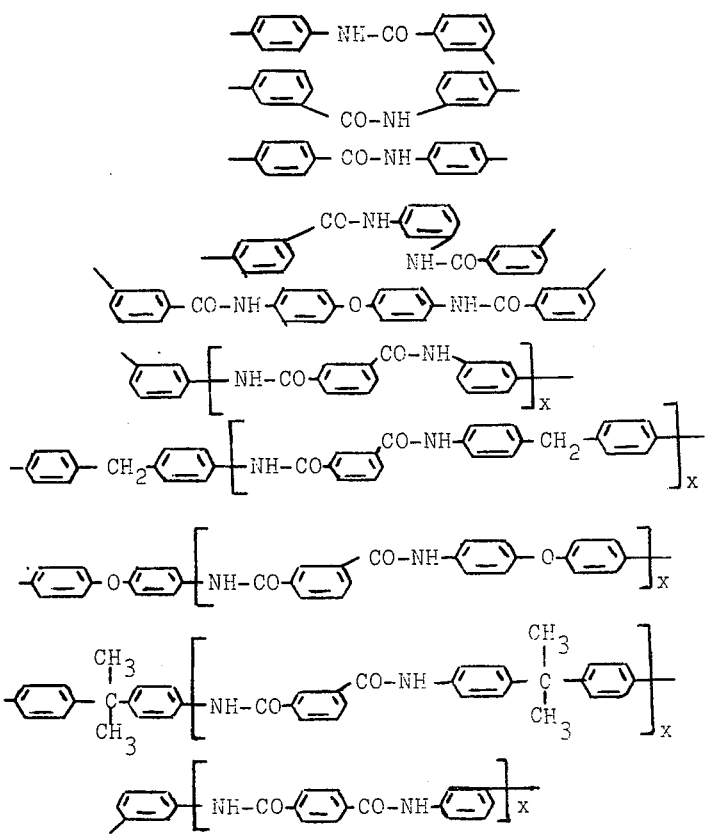

in which X is an integer of from 1 to about 500.

13. A polyamide-imide resin consisting essentially of

where R is a divalent radical containing two carbocyclic aromatic rings bridged by the group $$-\underset{\underset{O}{\|}}{C}-\underset{\underset{H}{|}}{N}-$$

and $n$ is an integer of about 50 to 15,000.

14. An insulated electrical conductor having a coating of the resin of claim 13.

15. A process for producing a high molecular weight polymeric intermediate soluble in a polar solvent which comprises reacting (A) at least one member selected from the group consisting of trimellitic anhydride halide and lower alkyl monoesters of trimellitoyl dihalide with (B) at least one primary aromatic amine selected from the group consisting of diaminobenzanilides and amine terminated aromatic carbocyclic polyamides by mixing together (A) and (B) at a temperature up to about 150°C in a polar solvent and recovering the resulting polymer solution.

16. The process of claim 15 wherein the halides are chlorides.

17. The process of claim 16 wherein (A) is trimellitic anhydride chloride.

* * * * *